United States Patent
Golsch (10) Patent No.: US 9,247,373 B2
(45) Date of Patent: Jan. 26, 2016

(54) METHOD OF DETERMINING USER INTENT TO USE SERVICES BASED ON PROXIMITY

(71) Applicant: Denso International America, Inc., Southfield, MI (US)

(72) Inventor: Kyle N. Golsch, Pontiac, MI (US)

(73) Assignee: Denso International America, Inc., Southfield, MI (US)

( * ) Notice: Subject to any disclaimer, the term of this patent is extended or adjusted under 35 U.S.C. 154(b) by 433 days.

(21) Appl. No.: 13/782,269

(22) Filed: Mar. 1, 2013

(65) Prior Publication Data

US 2014/0248863 A1    Sep. 4, 2014

(51) Int. Cl.
*H04B 1/38* (2015.01)
*H04W 4/00* (2009.01)
*H04W 4/04* (2009.01)

(52) U.S. Cl.
CPC .............. *H04W 4/001* (2013.01); *H04W 4/046* (2013.01)

(58) Field of Classification Search
CPC .............................. H04W 4/001; H04W 4/046
See application file for complete search history.

(56) References Cited

U.S. PATENT DOCUMENTS

| | | | |
|---|---|---|---|
| 6,491,194 B2 | 12/2002 | Marvin | |
| 2005/0164728 A1* | 7/2005 | Matsubara et al. | 455/521 |
| 2005/0277445 A1 | 12/2005 | Bae | |
| 2010/0097239 A1* | 4/2010 | Campbell et al. | 340/825.25 |
| 2010/0279612 A1 | 11/2010 | Harwood et al. | |
| 2011/0062916 A1 | 3/2011 | Farahani | |
| 2011/0210830 A1* | 9/2011 | Talty | H04B 5/0031 340/10.51 |
| 2011/0227527 A1 | 9/2011 | Zhu et al. | |
| 2012/0214472 A1* | 8/2012 | Tadayon et al. | 455/418 |
| 2013/0012123 A1* | 1/2013 | DeLuca | 455/39 |
| 2013/0147638 A1* | 6/2013 | Ricci | G06F 9/54 340/905 |
| 2014/0091903 A1* | 4/2014 | Birkel | B60R 25/24 340/5.54 |
| 2014/0142783 A1* | 5/2014 | Grimm et al. | 701/2 |

* cited by examiner

*Primary Examiner* — Keith Fang
(74) *Attorney, Agent, or Firm* — Harness, Dickey & Pierce, P.L.C.

(57) ABSTRACT

A method for accessing functionality of a mobile electronic device through a vehicle system onboard a motor vehicle. The method includes making functionality of the mobile electronic device accessible through the vehicle system based on where a sensor that the mobile electronic device is paired with is physically located about the vehicle.

13 Claims, 9 Drawing Sheets

METHOD OF DETERMINING USER INTENT TO USE SERVICES BASED ON PROXIMITY

FIELD

The present disclosure relates to methods for controlling vehicle telecommunication, information access, and entertainment functionality. In particular, the present disclosure relates to methods for controlling such functionality based on the location of a user's mobile electronic device, such as a smartphone.

BACKGROUND

This section provides background information related to the present disclosure, which is not necessarily prior art.

Vehicles often include a system for wirelessly pairing with a user's smartphone, such as with a Bluetooth connection. Once the phone is paired, a user's telephone conversation can be conducted using the vehicle's audio speakers and a microphone mounted in the passenger cabin, typically on the rear view mirror. Such systems are difficult to setup and operate, and they sometimes function in a manner contrary to what the user intended. For example, if a user talking on their smartphone outside of the vehicle decides to start the vehicle remotely, then the phone call will often automatically transfer to the vehicle's hands-free system, which will prevent the user from participating in the call unless they enter the vehicle. Another example is a situation where the user receives a telephone call while operating the vehicle. Typically, the call will automatically be broadcast through the vehicle's audio system. If the user does not want another occupant to hear the call, then the user must navigate a complex menu on either the smartphone or a vehicle interface to disconnect the phone, which is obviously undesirable when the user is operating the vehicle.

Another issue with current systems occurs when multiple smartphones are present in the vehicle. If both phones were previously paired with the vehicle, difficulties may arise as to which phone will take precedent and under what circumstances. A priority scheme is sometimes implemented, whereby a phone designated with a high priority takes precedent over a phone with a lower priority. But priority schemes are often too rigid and difficult to modify, particularly during operation of the vehicle.

SUMMARY

This section provides a general summary of the disclosure, and is not a comprehensive disclosure of its full scope or all of its features.

The present teachings provide for a method for accessing functionality of a mobile electronic device through a vehicle system onboard a motor vehicle. The method includes making functionality of the mobile electronic device accessible through the vehicle system based on where a sensor that the mobile electronic device is paired with is physically located about the vehicle.

The present teachings provide for an additional method for accessing functionality of a mobile electronic device through a vehicle system onboard a vehicle. The method includes wirelessly pairing the mobile electronic device with the vehicle system, reading a device ID from the mobile electronic device with a sensor mounted proximate to a storage location in response to placement of the mobile electronic device at the storage location, and providing access to functionality of the mobile electronic device through the vehicle system, the functionality selected by a user of the vehicle system.

The present teachings provide for another method for accessing functionality of a mobile electronic device through a vehicle system onboard a vehicle. The method includes wirelessly pairing the mobile electronic device with the vehicle system, and identifying functionality of the mobile electronic device to be accessible through the vehicle system based on either user inputs entered using a display screen of the vehicle system, or functionality of the mobile electronic device selected directly through the device.

The present teachings provide for yet another method for accessing functionality of a mobile electronic device through a vehicle system onboard a vehicle. The method includes wirelessly pairing the mobile electronic device with the vehicle system, identifying functionality of the mobile electronic device to be accessible through the vehicle system in response to user inputs entered using a display screen of the vehicle system, and identifying the mobile electronic device to be controlled by the vehicle system by reading a device ID from the mobile electronic device with a sensor of the vehicle system in response to the mobile electronic device being moved into close proximity to the sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1A, 1B:
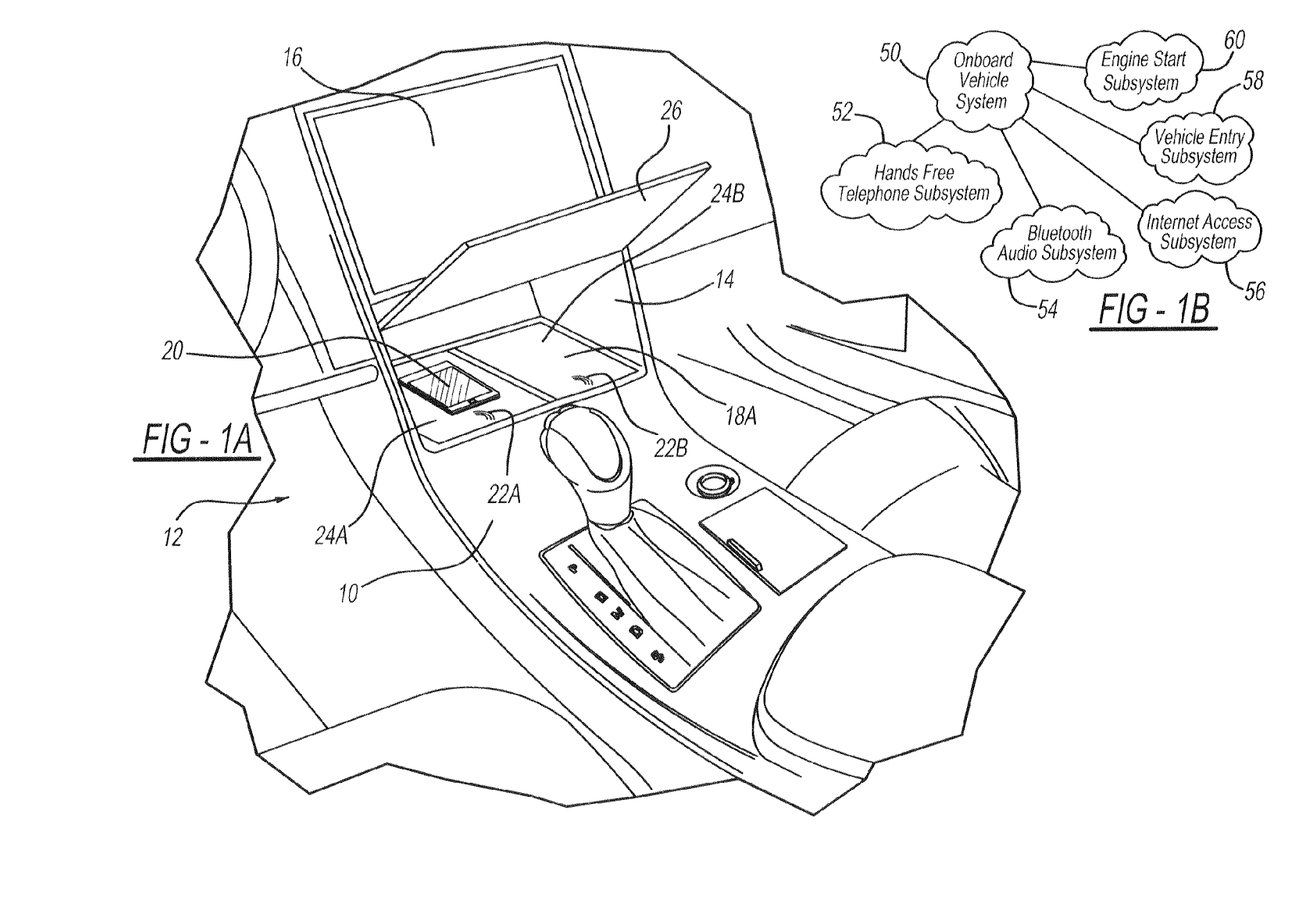
FIG. 1A illustrates a vehicle center counsel including a storage receptacle for a mobile electronic device.
FIG. 1B is a schematic view of a vehicle system including a plurality of subsystems.

With initial reference to FIG. 1A, a center counsel 10 of a vehicle passenger cabin 12 is illustrated. The center counsel 10 defines a storage receptacle 14 and includes a display 16. Seated within the storage receptacle 14 is a charging pad 18A for a mobile electronic device 20.

The storage receptacle 14 can be any recess or container suitable to receive and retain the mobile electronic device 20 therein. The storage receptacle 14 can be included within the center counsel 10, or can be located at any other suitable location within the passenger cabin 12. As illustrated, the storage receptacle 14 is included within the center counsel 10 just below the display 16. While the storage receptacle 14 is illustrated as including the charging pad 18A, the charging pad 18A need not be included.

The display 16 can be any suitable device for displaying text and images to occupants of the vehicle passenger cabin 12, such as a suitable LCD display. The display 16 can be dedicated to provide access to functionality of the mobile electronic device 20, as described herein, or can be a multi-purpose display. For example, the display 16 can provide access to navigation, climate control, radio, and audio system functionality as well.

The charging pad 18A can be any suitable device capable of charging a battery of the mobile electronic device 20 seated thereon, such as by electromagnetic induction. The charging pad 18A can be any suitable shape or size. For example, the charging pad 18A can be sized to fit a single mobile electronic device 20, or two mobile electronic devices 20 seated side-by-side. As illustrated, the charging pad 18A includes a first half or side 24A and a second half or side 24B, each of which is large enough to accommodate one mobile electronic device 20.

The charging pad 18A includes a first sensor 22A at the first side 24A of the charging pad 18A, and a second sensor 22B at the second side 24B of the charging pad 18A. The first and the second sensors 22A and 22B can be any suitable sensors for reading data from the mobile electronic device 20. For example, the first and second sensors 22A and 22B can be near field communication sensors (NFC) configured to read a device ID of the mobile electronic device 20, which is unique to the electronic device 20. The device ID can be actively transmitted from the mobile electronic device 20, or passively stored in the mobile electronic device 20. When the mobile electronic device 20 is seated on or placed in very close proximity to either the first sensor 22A or the second sensor 22B, the device ID will be read by either the first sensor 22A or the second sensor 22B and input to an onboard vehicle system 50 (FIG. 1B) as further described herein. To retain the mobile electronic device 20 on the charging pad 18A, the storage receptacle 14 can include a suitable retention device therein to prevent the mobile electronic device from being unintentionally separated from the charging pad 18A, such when the vehicle passes over a bump in the road. To retain the mobile electronic device 20 within the storage receptacle 14, the storage receptacle 14 can include a cover 26. The charge of the charging pad 18A can be interleaved with the reading of the device ID to prevent any interference issues that may occur if the device ID is read while the device 20 is being charged.

The mobile electronic device 20 can be any suitable mobile electronic device capable of communicating with the onboard vehicle system 50 wirelessly using any suitable wireless connection, such as with a Bluetooth or WiFi connection for example, and capable of communicating a device ID to the onboard vehicle system 50 to identify the mobile electronic device 20 to the onboard vehicle system 50. Further, the mobile electronic device 20 can be any suitable device capable of receiving and transmitting data, such as by way of a cellular connection, to be accessed by a user of the device 20. For example, the data can be voice data associated with a telephone call, internet data, MMS data, SMS data, or navigation data, such as GPS coordinates. The device 20 can thus be a suitable smart phone, tablet computer, or PDA.

With reference to FIG. 1B, the onboard vehicle system 50 can include any suitable system(s) and sub-system(s) capable of communicating with the mobile electronic device 20 to permit control of, and access to, functionality of the mobile electronic device 20 within the vehicle passenger cabin. The onboard vehicle system 50 can communicate with the mobile electronic device 20 in any suitable manner, such as with a suitable wireless connection. The onboard vehicle system 50 can include a hands free telephone subsystem 52, to permit hands-free operation of the mobile electronic device 20 through the vehicle's audio speakers and using a microphone mounted within the passenger cabin 12. The system 50 can include a Bluetooth audio subsystem 54 to play audio files stored on the device 20 through the audio speakers of the passenger cabin 12. The system 50 can include an Internet access subsystem 56 to permit access to the Internet through the mobile electronic device 20. For example, Internet websites and data can be viewed on the display 16, and commands for accessing data or webpages can be input using the display 16 or any other suitable input device. The system 50 can further include a vehicle entry subsystem 58, which can unlock doors of the vehicle upon determining that the device ID of the device 20 is authorized. The system 50 can also include an engine start subsystem 60, which can enable push-button start of the vehicle if the device ID of the device 20 is authorized.

Figure 2:
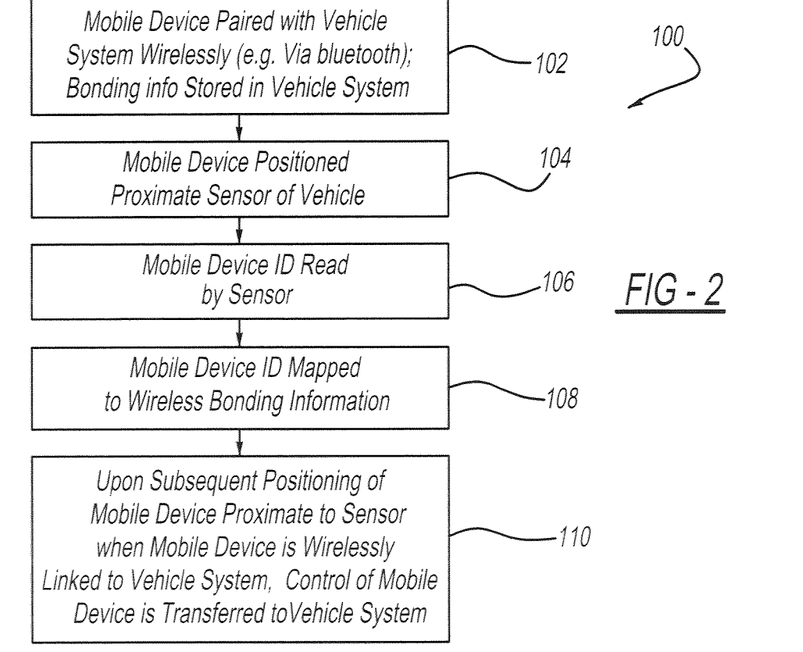
FIG. 2 illustrates a method for pairing the mobile electronic device with the vehicle system.

For the onboard vehicle system 50 to provide access to and control of the functionality of the mobile electronic device 20, the device 20 must first be connected to the onboard vehicle system 50. The device 20 can be connected to the system 50 in any suitable manner, such as illustrated in FIG. 2 for example at reference numeral 100. With initial reference to block 102, if the device 20 was not previously connected to the system 50, it must first be paired therewith. The device 20 can be paired with the onboard vehicle system 50 in any suitable manner, such as with a wireless Bluetooth connection. Bonding information regarding the pairing of the mobile electronic device 20 with the onboard vehicle system 50 is stored in the system 50. The device 20 is subsequently positioned in close proximity to one of the first or the second sensors 22A and 22B at block 104. At block 106, the mobile device ID of the device 20, which is unique to the device 20, is read by the first sensor 22A or 22B, and at block 108 the device ID is mapped to the bonding information previously stored in the system 50. At block 110, the primary communication system of the device 20, such as Bluetooth communication, is activated if not yet previously activated. Activation can occur in any suitable manner, such as in response to an activation signal received by the device 20 transmitted from the system 50 through the sensors 22A or 22B. With reference to block 112, when the device 20 is wirelessly linked to the onboard vehicle system 50 and subsequently brought to within close proximity of the first sensor 22A or the second sensor 22B, control of the device 20 will be transferred to the onboard vehicle system 50 as further described herein.

After control of the mobile electronic device 20 is transferred to the onboard vehicle system 50, the device 20 can generally be operated using the onboard vehicle system 50, such as with one or more of the subsystems 52-56. For example, a user will be alerted to an incoming call to the device 20 by the hands free telephone subsystem 52. To answer the call, the user will press an answer button typically located on the steering wheel and the voice of the caller will be broadcast throughout the cabin 12 over speakers of the cabin 12. A microphone within the passenger cabin 12 will receive the user's voice, which is subsequently transmitted by the device 20 as voice data to a cellular network.

Audio files stored in the mobile electronic device 20 can be played through speakers of the cabin 12 by the Bluetooth audio subsystem 54. Audio data from the device 20 is transmitted to the Bluetooth audio subsystem 54 through the Bluetooth connection with the device 20, and subsequently played through speakers of the cabin 12. Internet data received by the device 20 can also be accessed in the passenger cabin 12 using the internet access subsystem 56, which includes the display 16. For example, weather or traffic information received by the device 20 can be transmitted to the internet access subsystem 56 through the Bluetooth link between the device 20 and the vehicle system 50. The weather and/or traffic information can then be shown on the display 16 for access by the user. The display 16 can also give the user access to any suitable webpage or web application, and can be a touch sensitive display capable of receiving inputs from the user to input data, which can be subsequently transmitted to the device 20 for ultimate transmission to a server hosting the website or web application for two way data transfer. The vehicle entry subsystem 58 and the engine start subsystem 60 will be described herein in connection with FIGS. 8, 9A and 9B.

Figure 3A:
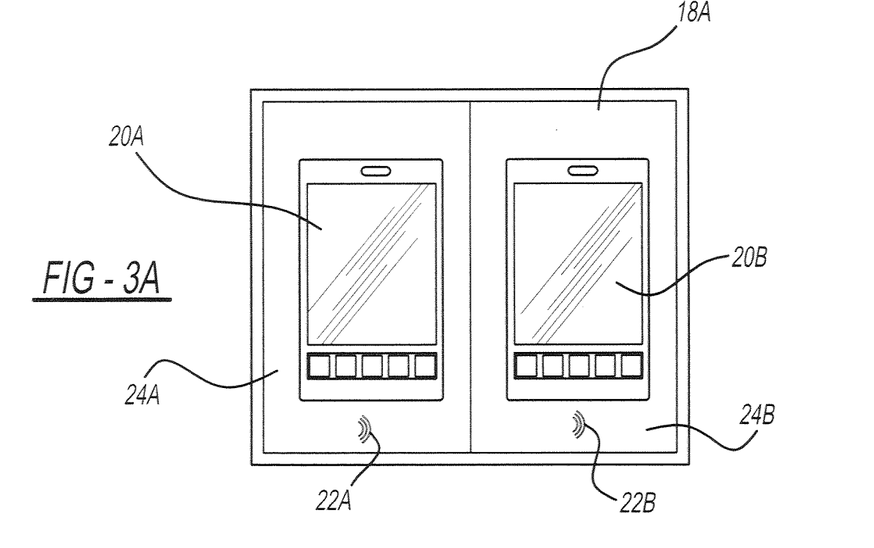
FIG. 3A illustrates a charging pad for charging multiple mobile electronic devices, selection of the device to connect to the vehicle system is based on the position of each device on the charging pad.

With additional reference to FIG. 3A, the charging pad 18A and use thereof will be described in additional detail. As illustrated, the charging pad 18A can be sized to accommodate both a first mobile electronic device 20A and a second mobile electronic device 20B. In order to avoid any interference issues that may result from wirelessly linking both the first device 20A and the second device 20B to the onboard vehicle system 50, the system 50 will only link with the device 20 seated on the first side 24A of the charging pad 18A, which as illustrated is the first mobile electronic device 20A. Alternatively, the system 50 can be configured to only link with the second device 20B seated on the second side 24B, which is the passenger side. Because it will be more common for a driver to place his or her device 20 on the charging pad 18A, the system 50 can be configured to link with the first device 20A at the first side 24A as the default setting. The onboard vehicle system 50 will know which of the devices 20A and 20B is seated on the first side 24A by reading the device ID of the first device 20A using sensor 22A.

Figures 3B, 3C, 4:
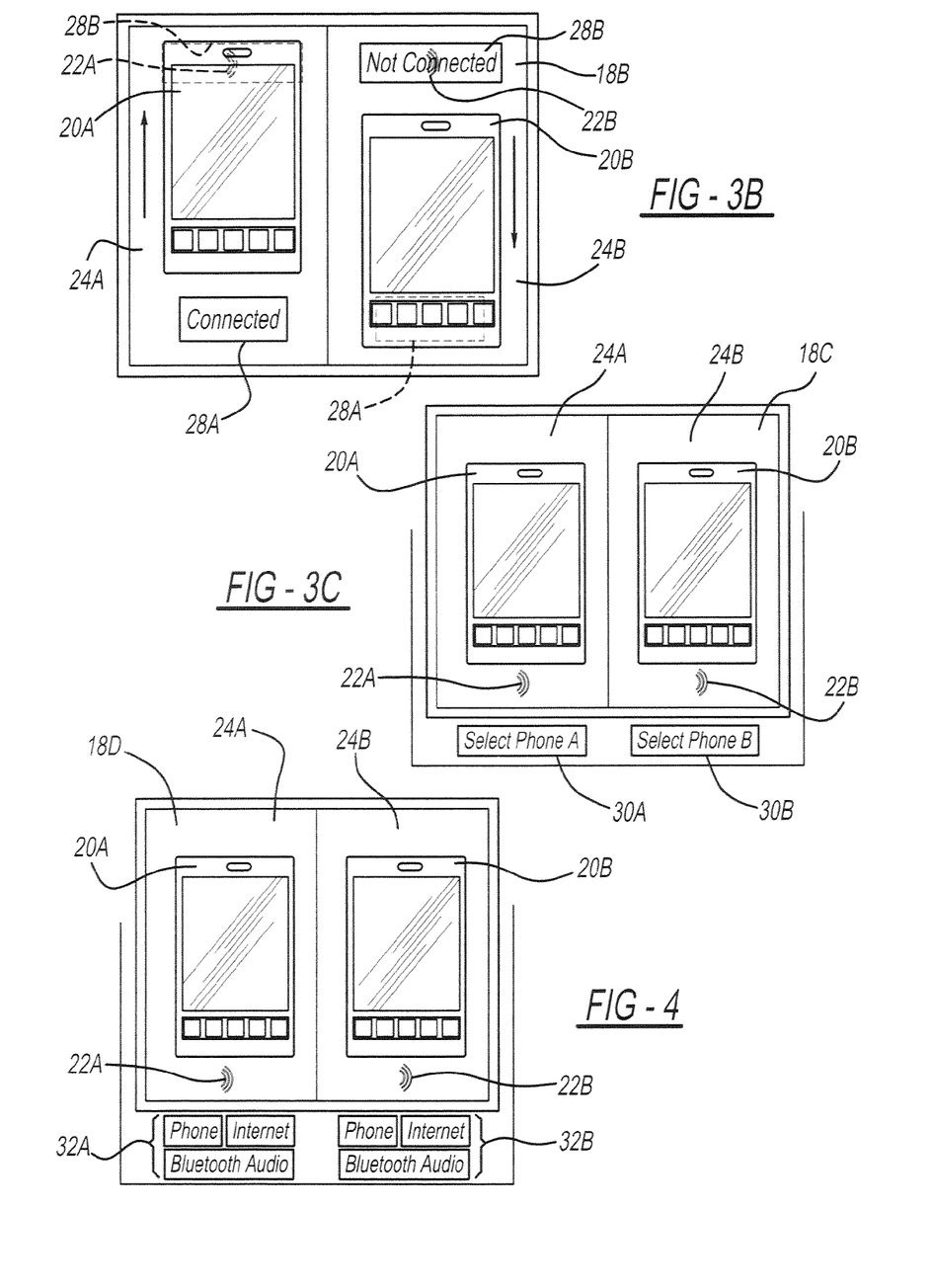
FIG. 3B illustrates another charging pad for charging multiple mobile electronic devices, selection of the device to connect to the vehicle system is based on the position of each device on the charging pad.
FIG. 3C illustrates an additional charging pad for charging multiple mobile electronic devices, selection of the device to connect to the vehicle system is performed by actuating a button proximate to the desired device.
FIG. 4 illustrates yet another charging pad for charging multiple mobile electronic devices, associated with the pad are multiple mode buttons for selecting functionality of the device for access through the vehicle system.

FIG. 3B illustrates an additional charging pad according to the present teachings at reference numeral 18B. The first sensor 22A is located at a rear of the first side 24A of the charging pad 18B, and the second sensor 22B is located at a rear of the second side 24B. The user can select either the first device 20A or the second device 20B for connection with the system 50 by moving the selected device 20A/20B to the rear of the charging pad 18B such that the selected device 20A/20B is seated on or proximate to the sensor 22A/22B associated therewith. For example and as illustrated in FIG. 3B, to connect the first device 20A with the system 50, the first device 20A is slid backward such that it is proximate to the first sensor 22A so that the system 50 can detect the presence of the first device 20A via the first sensor 22A (and the user's intent to connect the first device 20A by virtue of the user's movement of the first device 20A). Because the second device 20B has not been moved to the second sensor 22B, the system 50 will not detect the presence of the second device 20B at the second sensor 22B and thus will not pair with the second device 20B. To provide the user with visual cues identifying which of the devices 20A/20B has been selected to be paired with the system 50, the charging pad 18B includes "connected" labels 28A at a front of the charging pad 18B and "not connected" labels 28B at a rear of the charging pad 18B. Therefore, when the first device 20A is slid backward to make contact with the first sensor 22A, the "connected" label 28A is exposed so that the user knows that the first device 20A has been selected for connection. Because the second device 20B has not been slid backward, the "not connected" label 28B on the second side 24B will be exposed, thus notifying the user that the second device 20B has not been selected for connection. If both the first device 20A and the second device 20B are moved to the first sensor 22A and the second sensor 22B respectively, the system 50 will connect with the first device 20A and not the second device 20B because the first device 20A is at the driver's side.

FIG. 3C illustrates another charging pad according to the present teachings at reference numeral 18C. Associated with the first side 24A of the charging pad 18C is a first selector 30A. Associated with the second side 24B of the charging pad 18C is a second selector 30B. The selectors 30A and 30B can each be any suitable device for accepting an input from the user, such as a button, switch, or touch pad. If the user desires to connect the first device 20A to the system 50, the user need only actuate the first selector 30A, such as by depressing the first selector 30A when the first selector 30A is a button. Similarly, if the user desires to connect the second device 20B to the system 50, the user need only actuate the second selector 30B. The selectors 30A and 30B can be located at any suitable location within the passenger cabin 12, such as on the steering wheel, dashboard, or incorporated within a heads-up display. The first selector 30A and the second selector 30B can be provided with status indicators, such as backlighting, to identify which of the first selector 30A and the second selector 30B has been selected.

An additional charging pad according to the present teachings is illustrated in FIG. 4 at reference numeral 18D. Associated with the first side 24A of the charging pad 18A are a plurality of first selectors 32A. Associated with the second side 24B of the charging pad 18D are a plurality of second selectors 32B. The first and second selectors 32A and 32B allow the user to select a particular functionality or service of either the first device 20A or the second device 20B to be accessed through, and controlled by, the onboard vehicle system 50. If one of the selectors 32A is selected, then the onboard vehicle system 50 will connect to the first device 20A. If one of the selectors 32B is selected, then the onboard vehicle system 50 will connect to the second device 20B. The first and the second selectors 32A and 32B can permit selection of any suitable function of the devices 20A/20B, such as telephone functionality, internet functionality, or Bluetooth audio functionality. Therefore, if the user desires to play an audio file from the first device 20A using the Bluetooth audio subsystem 54, for example, the user will select the "Bluetooth audio" selector 32A. If the user desires to select the telephone functionality of the second device 20B for operation using the hands free telephone subsystem 52, the user will select the "phone" selector of the second selectors 32B.

FIGS. 5A-5D generally illustrate use of the display 16 to select functionality of a particular device 20 to be provided through the onboard vehicle system 50. Associated with the display 16 is a sensor 34, which is similar to the first and second sensors 22A and 22B and is configured to read a device ID from the device 20. The sensor 34 can be any suitable type of sensor, such as a NFC sensor. As described below, functionality of the device 20 to be provided through the onboard vehicle system 50 can be selected using the display 16 before the device 20 is identified and connected to the system 50 by bringing the device 20 into contact with, or within close proximity to, the sensor 34. Alternatively, the device 20 can be identified and connected to the system 50 by bringing the device 20 into contact with, or within close proximity to, the sensor 34. Functionality of the device 20 to be provided through the onboard vehicle system 50 can then subsequently be selected using the display 16.

Figure 5A:
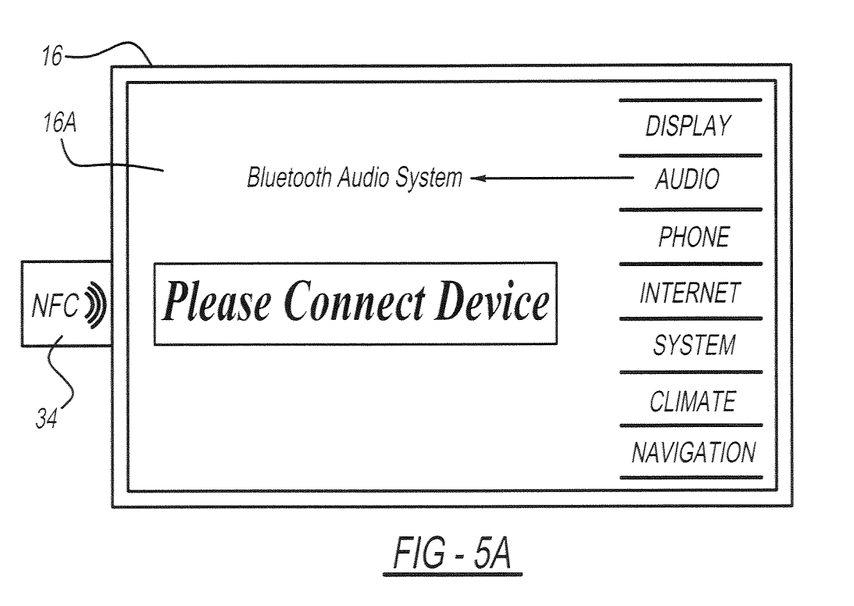
FIG. 5A illustrates a display of the vehicle system showing the vehicle system in a Bluetooth audio stream connection mode, associated with the display is a sensor for reading information from the mobile electronic device.

FIG. 5A illustrates the display 16 navigated to a Bluetooth audio system connection mode screen at 16A. The display 16 can be navigated to the Bluetooth audio system connection mode screen 16A in any suitable manner, such as by selecting the mode from a dropdown menu using touch inputs. To connect the mobile electronic device 20 with the Bluetooth audio subsystem 54 and select the Bluetooth audio functionality of the device 20 for operation through the Bluetooth audio subsystem 54, the user need only bring the device 20 into contact with, or within close proximity to, the sensor 34. The sensor 34 will then read the device ID off the device 20, convey the device ID to the vehicle system 50 in order to inform the vehicle system 50 that the user desires that the Bluetooth audio functionality of the device 20 be made accessible through the Bluetooth audio subsystem 54. The Bluetooth audio subsystem 54 will then make the Bluetooth audio system functionality of the device 20 accessible to the user in any suitable manner, such as by way of the display 16. For example, the display 16 at FIG. 5A will change from the connection mode screen 16A to a screen whereby the user can operate the Bluetooth audio functionality, such as a screen with a user interface for selecting a desired song and controlling the volume of the passenger cabin speakers.

Figure 5B:
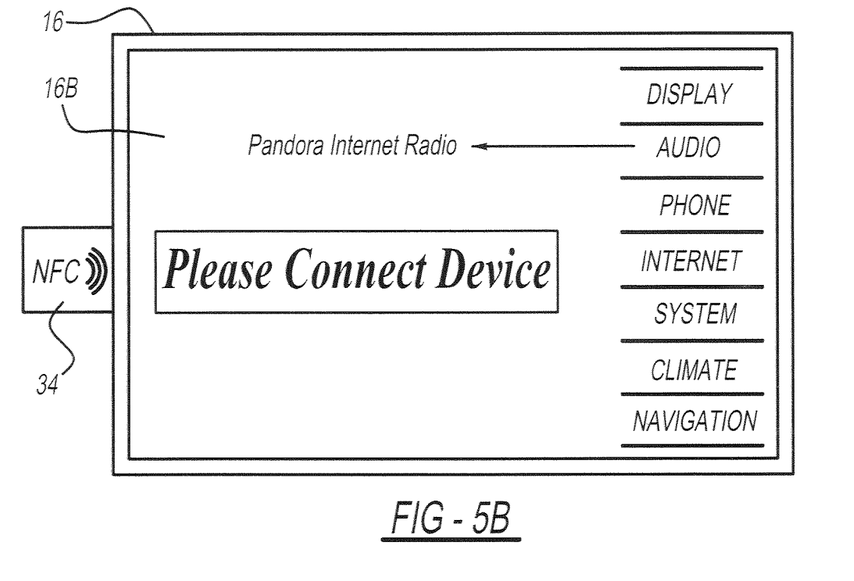
FIG. 5B illustrates the display at an internet radio connection mode screen.

With additional reference to 5B, the display 16 is illustrated as having been navigated to a Pandora radio connection screen 16B. To access the internet functionality of the device 20, the device 20 can be brought into contact with, or within close proximity to, the sensor 34. The sensor 34 will read the device ID from the device 20 to inform the onboard vehicle system 50 that the user desires to access the internet radio functionality of the device 20. The internet access subsystem 56 will then connect to the device 20, such as with a Bluetooth connection, to stream the audio from an internet radio source, such as Pandora, and permit control of the internet radio functionality of the device 20 through systems of the passenger cabin 12, such as the display 16.

Figure 5C:
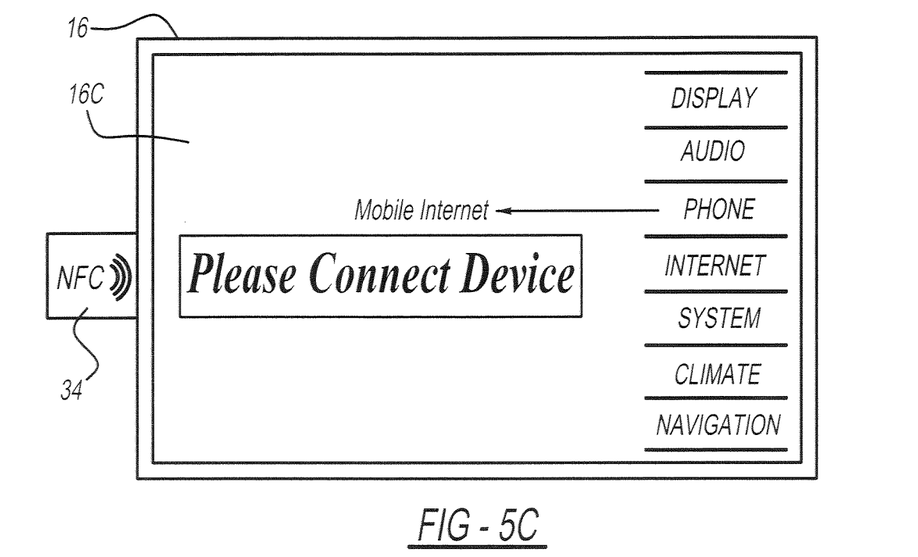
FIG. 5C illustrates the display at a mobile internet connection mode screen.

FIG. 5C illustrates the display 16 navigated to a mobile internet connection screen at 16C. To transfer mobile internet functionality from the device 20 to the onboard vehicle system 50, the device 20 is brought into contact with, or within close proximity to, the sensor 34. The sensor 34 reads the device ID of the device 20 to inform the onboard vehicle system 50 that the user of the device 20 desires to transfer internet functionality from the device 20 to the onboard vehicle system 50. The internet access subsystem 56 then takes control of the device 20 to make the Internet accessible to the user in the passenger cabin 12, such as through the display 16.

Figure 5D:
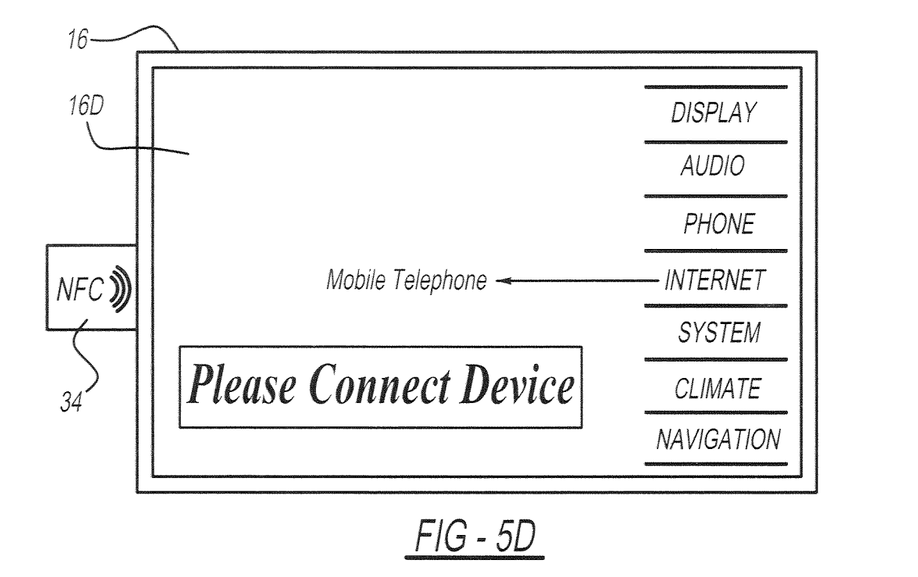
FIG. 5D illustrates the display at a mobile telephone connection mode screen.

FIG. 5D illustrates the display 16 navigated to a mobile telephone connection screen 16D. To transfer telephone functionality from the device 20 to the onboard vehicle system 50, such as to permit hands free telephone access in the passenger cabin 12, the device 20 is moved to the sensor 34, such that the sensor 34 can read the device ID off of the device 20. The device ID is processed by the onboard vehicle system 50, which instructs the hands free telephone subsystem 52 to connect with the device 20 to provide hands free telephone operation in the passenger cabin 12, such as through the audio system and one or more microphones of the passenger cabin 12.

Functionality of the device 20 to be accessed through the onboard vehicle system 20 can also be selected directly through the device 20. For example, if the user selects map functionality from the device 20, upon bringing the device 20 into contact with, or within close proximity to, the sensor 34, access to map functionality will be transferred to the onboard vehicle system 50 such that the user can view map and route information, for example, using the display 16.

Figure 6:
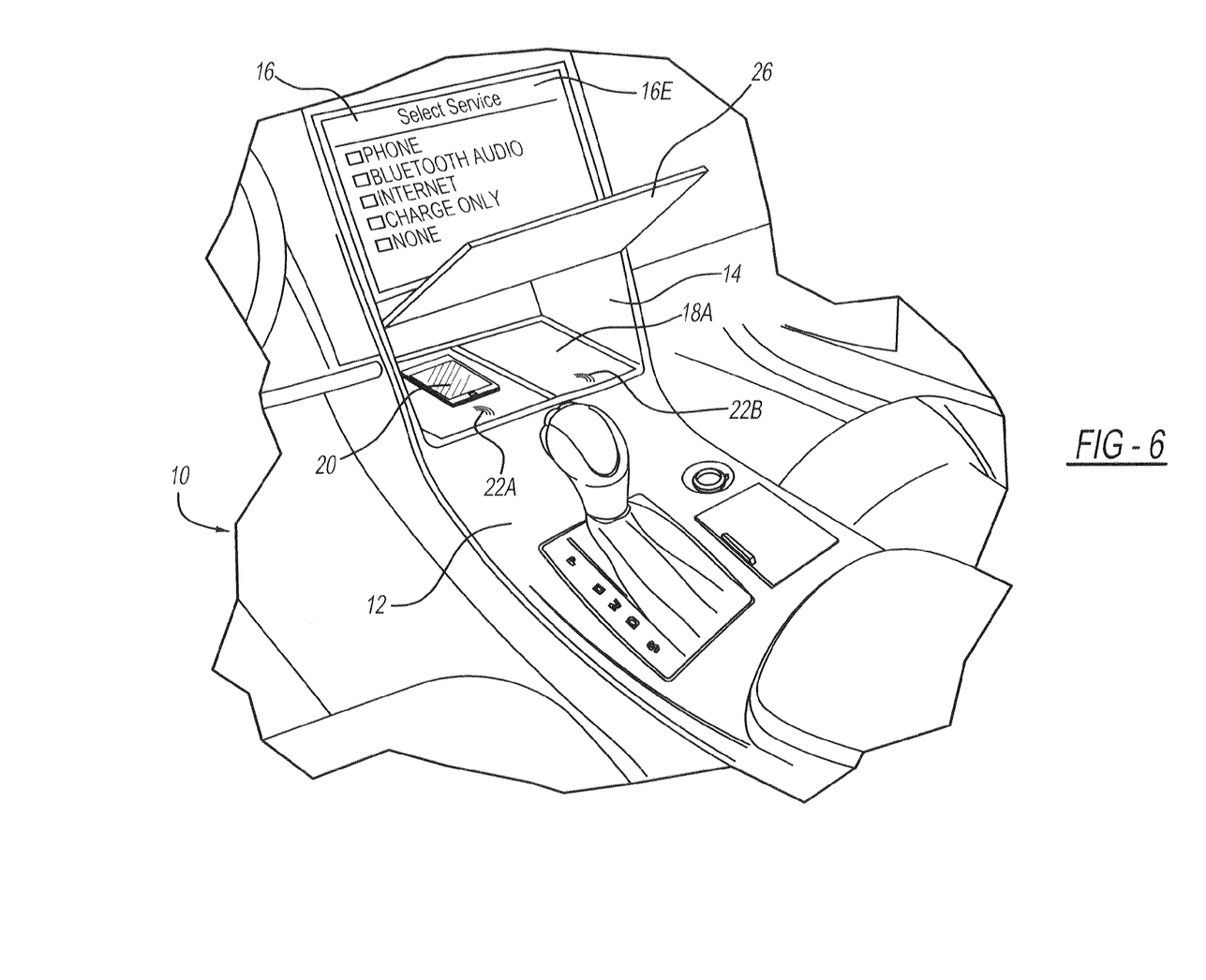
FIG. 6 illustrates a display of the vehicle system displaying various modes of operation for the mobile electronic device upon placement of the mobile electronic device in a storage receptacle.

In addition to moving the device 20 to the sensor 34 to identify to the vehicle system 50 the device 20 that the user would like to control using the vehicle system 50, the user may place the device 20 on the charging pad 18A, which will identify the device 20 to the vehicle system 50 by reading the device ID using either the first sensor 22A or the second sensor 22B, as described above. The user can then navigate the display 16 to a "select service" screen 16E, as illustrated in FIG. 6. The user may then simply select the particular functionality using the display 16, such as phone, Bluetooth audio, or internet functionality. The user may also select "charge only," whereby the device 20 will only be charged by the charging pad 18A and no functionality of the device will be transferred to the onboard vehicle system 50. Another option available to the user is the "none" mode, in which the device 20 will not be charged when placed on a charging pad 18A. In the "none" mode, placing the device 20 in the storage receptacle 14 on the charging pad 18A will not transfer functionality from the device 20 or charge the device 20. The device 20 will merely be stored in the storage receptacle 14. Storing the device 20 in the storage receptacle 14 with the cover 26 closed can be useful in a number of situations, such as when traveling over a rough road and during an accident to prevent the device 20 from moving throughout the vehicle passenger cabin 12.

Figure 7A:
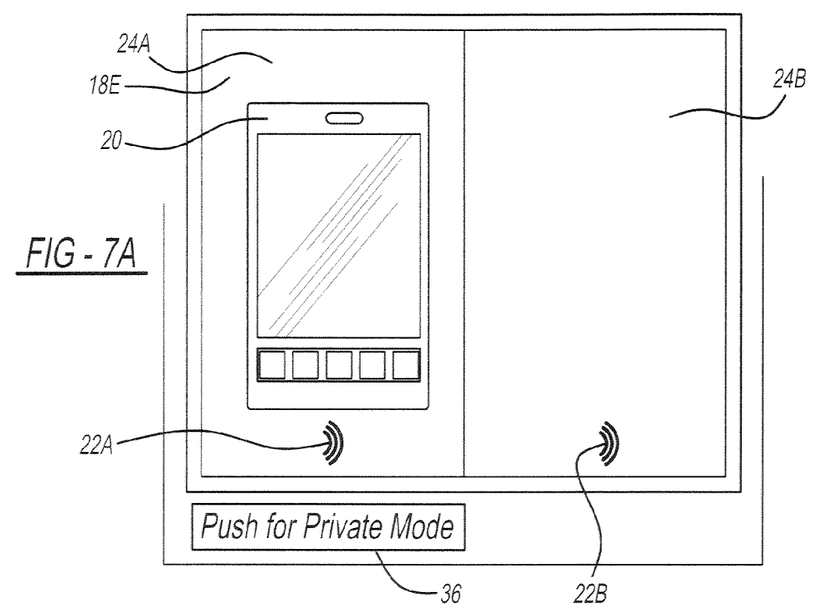
FIG. 7A illustrates a charging pad with a button associated therewith for placing a mobile electronic device paired with the vehicle system in private mode.

When a telephone call is accessed using the hands free telephone subsystem 52, the telephone conversation will be broadcast throughout the vehicle passenger cabin 12. In some instances, such as when additional persons are present in the passenger cabin 12 in addition to the participant in the phone call, there may be a desire to decouple the device 20 from the hands free telephone subsystem 52 so that the conversation is not broadcast throughout the passenger cabin 12, but is only accessible directly through the device 20. In this regard, FIG. 7A illustrates an additional charge pad according to the present teachings at reference numeral 18E. Associated with the charging pad 18E is a selector 36. The selector 36 provides for manual decoupling of the device 20 from the hands free telephone subsystem 52. The selector 36 can be any suitable selection device, such as a button, switch, touch pad, or sliding selector switch. The selector 36 can be provided with a label identifying its functionality, such as "push for private mode," as illustrated in FIG. 7A. Upon selection of the selector 36 by the user, the device 20 will decouple from the hands free telephone subsystem 52 to transfer the call back to the device 20 such that the voice at the other end of the call can only be heard through the speaker of the device 20, and the user must speak directly into a microphone of the device 20 in order for the user's voice to be heard by the person on the other end of the call.

Figure 7B:
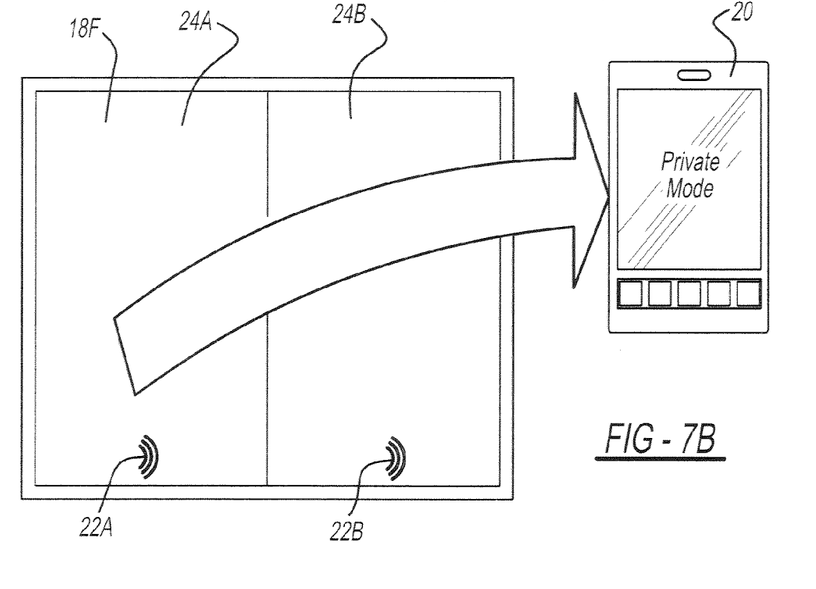
FIG. 7B illustrates removal of a mobile electronic device from a charging pad to place the mobile electronic device in private mode.

FIG. 7B illustrates another way in which the device 20 can be switched to a private mode, such that the telephone conversation is not broadcast throughout the passenger cabin 12 by the hands free telephone subsystem 52. Once the device 20 is removed from the charging pad 18F, the device ID will no longer be able to be read by the first or second sensors 22A or 22B, which will inform the hands free telephone subsystem 52 that the device 20 has been removed from the charging pad 18F and that the user desires to decouple the device 20 from the hands free telephone subsystem 52. The subsystem 52 will then cease broadcasting the call through the speakers of the passenger cabin 12 and transfer functionality of the call back to the device 20, which can connect with a Bluetooth earpiece or other suitable device to allow the user to privately conduct a call. As a result, the device 20 will be operational to conduct the call in the traditional manner, i.e., with the user speaking directly into the microphone of the phone and the voice on the other end of the call being heard only from the speaker on the device 20.

Figure 8:
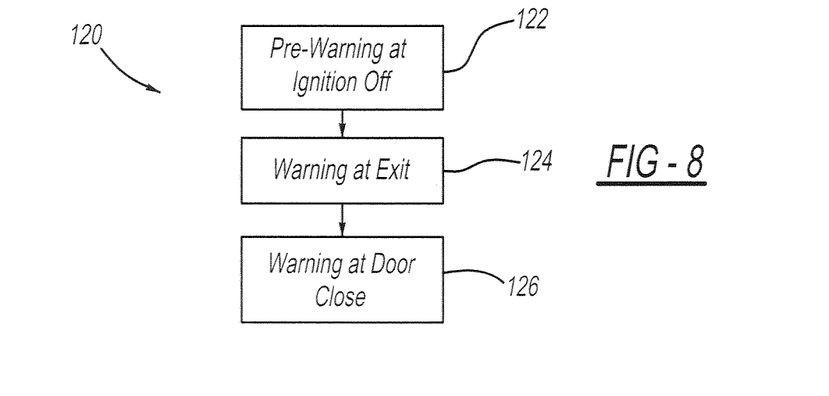
FIG. 8 illustrates a method for issuing a warning to a user upon exiting the vehicle to prevent the user from leaving his/her phone in the vehicle.

FIG. 8 illustrates a reminder system at reference numeral 120 to assist a user with remembering to take their device 20 with them upon exiting the vehicle passenger cabin 12. With initial reference to block 122, the onboard vehicle system 50 provides a pre-warning when the ignition is turned off. The pre-warning can be any suitable subtle warning or reminder to the user that the device 20 remains in the storage receptacle 14, such as a subtle chime or a voice reminder. The vehicle system 50 will know when the device 20 is seated on the charging pad 18 because the device ID will be accessible by either the first sensor 22A or the second sensor 22B. If the user removes the device 20 such that the device ID is no longer readable using the sensors 22A/22B, the pre-warning will cease.

With additional reference to block 124, an additional, more aggressive warning will be provided by the system 50 when the user opens the door or is no longer seated on the seat of the passenger cabin 12, such as detected by a weight sensor of the seat or any other occupant detection system. The vehicle system 50 will issue a more aggressive warning than the pre-warning, such as a more aggressive chime, flashing dome lights, or any other suitable visual warning, including illuminating a warning light, ambient light, or symbol that is proximate to or within the storage receptacle 14. So that the user is able to easily identify the visual warning, the warning can be directed to the storage receptacle 14, such as by illuminated arrows pointing at the charging pad 18. The warning can also be provided by the device 20, such as in the form of an audible or visual warning, as well as a vibration warning.

With reference to block 126, the warning can be further intensified once the user closes the door after exiting the vehicle. For example, the vehicle horn may sound and an exterior speaker of the vehicle may broadcast a simple message, such as "don't forget your phone," and the headlights of the vehicle may flash. To interrupt or cease any of the warnings, the user can express his or her intent to leave their device 20 within the passenger cabin 12 to the vehicle system 50. For example, the passenger cabin 12 or the display 16 can include a cease warning selector or button that will disable the warnings. The user can also raise their device 20 from the charging pad 18A, such that the device ID of the device 20 cannot be read by the sensors 22A/22B for a brief period of time, thereby informing the vehicle system 50 that the user intends to leave their device 20 in the passenger cabin 12 and that the warnings should not be provided.

Figure 9A:
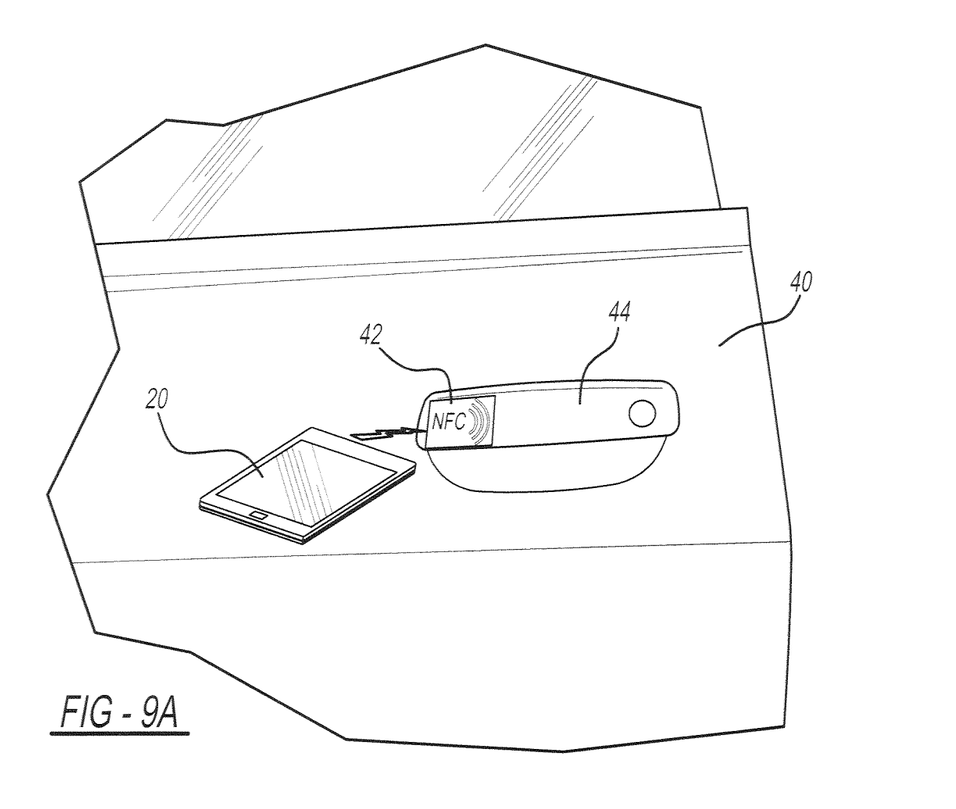
FIG. 9A illustrates communication between a mobile electronic device and a sensor at a door handle of the vehicle.

With additional reference to FIG. 9A, a door 40 of the vehicle can include a door sensor 42 at an exterior thereof proximate to or on a door handle 44. The door sensor 42 can be any suitable sensor for communicating with the device 20, such as an NFC sensor. The door sensor 42 can be used to read an authentication code from the device 20, which is processed by the onboard vehicle system 50 using the vehicle entry subsystem 58 to determine whether the code is authentic and whether the door 40 should be unlocked. The door sensor 42 is particularly useful for reading codes encrypted in a passive NFC chip on the device 20, such that access to the vehicle can still be granted even if the battery of the device 20 has completely lost its charge.

Figure 9B:
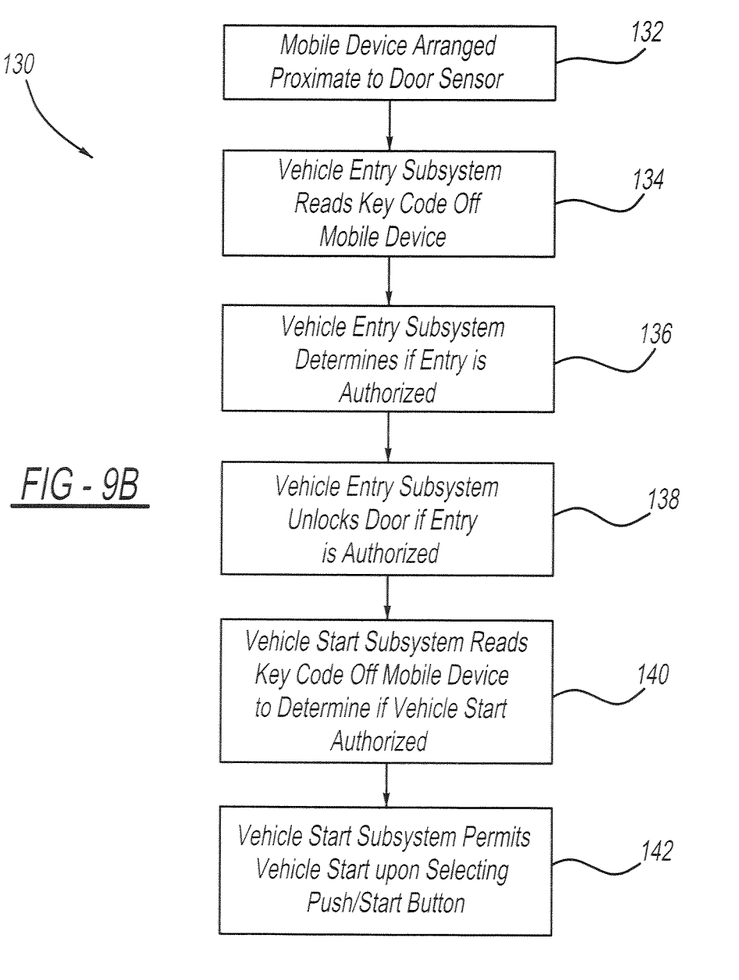
FIG. 9B illustrates a method of unlocking a vehicle door and authorizing vehicle ignition using a mobile electronic device.

FIG. 9B illustrates a method at reference numeral 130 for determining whether to grant entry to a vehicle passenger cabin 12 using the vehicle entry subsystem 58, and for authorizing engine start using the engine start subsystem 60. Starting at block 132, the mobile device 20 is arranged proximate to the door sensor 42. The vehicle entry subsystem 58 reads the authentication code from the mobile device 20 at block 134. At block 136, the vehicle entry subsystem 58 processes the code to determine whether it is authentic and whether it entitles a person presenting the code with access to the vehicle passenger cabin 12. The vehicle entry subsystem unlocks the door 40 at block 138 if the vehicle entry subsystem 58 determines that the bearer is authorized. At block 140, the engine start subsystem 60 will determine if the authentication code authorizes the bearer of the code to start the vehicle by reading the code using any suitable vehicle sensor of the subsystem 60 or the system 50 generally. If the engine start subsystem 60 determines that the bearer is authorized, the subsystem 60 will enable the vehicle to start, such as upon pressing an "engine start" button at block 142. The engine start subsystem 60 can be configured to restrict engine start until the device 20 is placed in the storage receptacle 14 on the charging pad 18, as a precaution to prevent direct use of the device 20 simultaneous with operation of the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for accessing functionality of a mobile electronic device through a vehicle system onboard a motor vehicle comprising:
    positioning a first mobile electronic device on a first pad within the motor vehicle and positioning a second mobile electronic device on a second pad within the motor vehicle;
    making functionality of the first mobile electronic device accessible through the onboard vehicle system by positioning the first mobile electronic device proximate to a first sensor of the first pad and positioning the second mobile electronic device away from a second sensor of the second pad; and
    making functionality of the second mobile electronic device accessible through the onboard vehicle system by positioning the second mobile electronic device proximate to the second sensor and positioning the first mobile electronic device away from the first sensor;
    wherein:
        a first connected area is at a first side of the first pad, and a first disconnected area is at a second side of the first pad that is opposite to the first side of the first pad; and
        a second connected area is at a first side of a second pad, and a second disconnected area is at a second side of the second pad that is opposite to the first side of the second pad.

2. The method of claim 1, further comprising:
    wirelessly pairing the first mobile electronic device with the vehicle system when the first mobile electronic device is moved to the first sensor;
    wirelessly pairing the second mobile electronic device with the vehicle system when the second mobile electronic device is moved to the second sensor; and
    a device ID of the first or second mobile electronic device paired is read by the first or second sensor of the vehicle system when the first or second mobile electronic device is brought into close proximity to the first or second sensor.

3. The method of claim 1, wherein the first or second mobile electronic device is wirelessly paired with a hands-free telephone communication subsystem of the vehicle system.

4. The method of claim 1, wherein the first or second mobile electronic device is wirelessly paired with an audio subsystem of the vehicle system.

5. The method of claim 1, wherein the first or second mobile electronic device is wirelessly paired with an Internet access subsystem of the vehicle system.

6. The method of claim 1, further comprising disconnecting the first or second mobile electronic device from the vehicle system when the first or second mobile electronic device is moved out of range of the first or second sensor.

7. The method of claim 1, further comprising selecting the functionality of the first or second mobile electronic device to be accessible through the onboard vehicle system from a plurality of available functions listed on a display.

8. The method of claim 1, further comprising issuing an alert as a user exits the vehicle to notify the user that the first or second mobile electronic device remains in the vehicle.

9. The method of claim 1, wherein:
    the first sensor is at the first connected area of the first pad, and spaced apart from the first disconnected area of the first pad; and
    the second sensor is at the second connected area of the second pad, and spaced apart from the second disconnected area of the second pad.

10. The method of claim 9, wherein;
    the first mobile electronic device is connected to the vehicle system when the first mobile electronic device is positioned at the first connected area, and the second mobile electronic device is not connected to the vehicle system when the second mobile electronic device is positioned at the second disconnected area; and
    the first mobile electronic device is not connected to the vehicle system when the first mobile electronic device is positioned at the first disconnected area, and the second mobile electronic device is connected to the vehicle system when the second mobile electronic device is positioned at the second connected area.

11. The method of claim 9, wherein when the first mobile electronic device is at the first connected area and the second mobile electronic device is at the second connected area, only the one of the first and second mobile electronic devices designated as a priority device is connected to the vehicle system.

12. The method of claim 1, wherein the first connected area of the first pad is at a front of the first pad, and the first disconnected area of the first pad is at a rear of the first pad; and
    wherein the second connected area of the second pad is at a front of the second pad, and the second disconnected area of the second pad is at a rear of the second pad.

13. The method of claim 1, wherein each one of the first pad and the second pad are recharging pads.

* * * * *